Sept. 17, 1940.   T. B. HINTGEN   2,215,037
FLY NET
Filed May 12, 1939   2 Sheets-Sheet 2

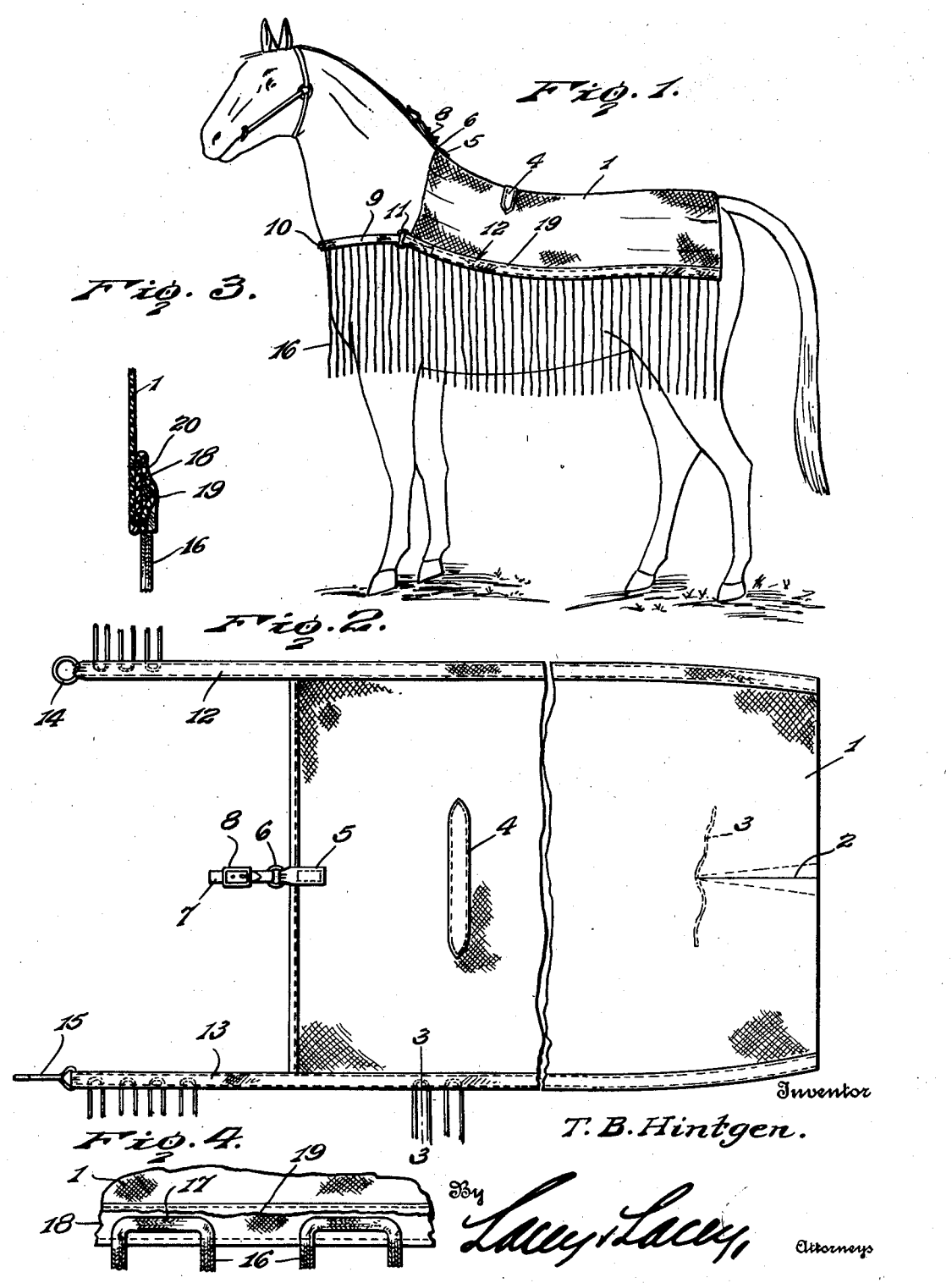

Inventor
T. B. Hintgen.
By Lacey & Lacey, Attorneys

Patented Sept. 17, 1940

2,215,037

UNITED STATES PATENT OFFICE 2,215,037

FLY NET

Theodore B. Hintgen, George, Iowa

Application May 12, 1939, Serial No. 273,331

6 Claims. (Cl. 54—81)

This invention relates to an improved fly net.

One object of the invention is to provide a fly net wherein the strings employed may be braided, laced or woven in any other manner so that said strings will neither unravel or tangle, nor require metal tips to prevent such unraveling.

Another object of the invention is to provide a device of this character wherein the strings may be either round or flat and may also be hollow or solid.

A further object of the invention is to provide a fly net employing improved breast straps.

And the invention has as a still further object to provide a fly net wherein the strings are attached to the body by means of folding the margins of the body about portions of the strings so that the need for webbing will be eliminated.

Other and incidental objects of the invention not mentioned hereinbefore will become apparent during the course of the following description.

Referring now to the drawings forming a part of my application:

Figure 1 is a perspective view showing my improved fly net as it would appear installed on a horse.

Figure 2 is a top plan view of the improved fly net, portions of but a few of the strings being shown.

Figure 3 is an enlarged detail vertical sectional view on the line 3—3 of Figure 2.

Figure 4 is an enlarged detail side elevation showing the manner of securing the strings to the net.

Figure 5:
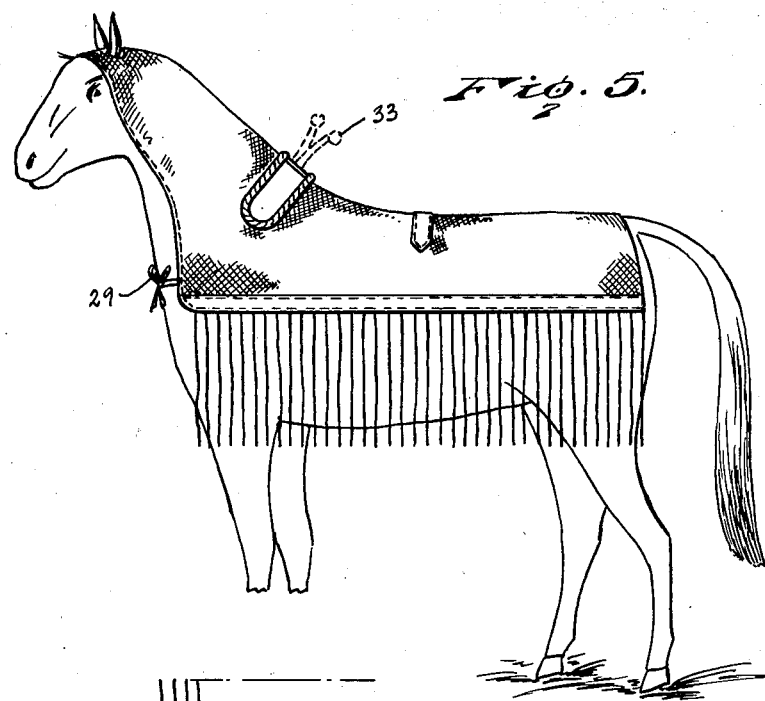
Figure 5 is a side elevation showing a slightly modified form of the invention as it would appear in position on a horse.

Referring now more particularly to the accompanying drawings, wherein like reference numerals will be seen to designate like parts throughout the various views, the numeral 1 indicates in general the body of my improved fly net. The body is formed, near its rear end portion, with a pleat 2 having a tie string 3 at its inner end. The pleat 2 and tie string 3 will serve effectively to draw the rear of the body to fit snugly about the horse. The body 1 is preferably formed of light weight canvas or other suitable material.

The body is provided, near its midportion, with a transversely extending reinforcing strap 4. At its forward edge, the body is provided with a loop 5 which has a ring 6 carried thereby. A strap 7, which is to be connected to the headstall of the bridle is carried by the ring 6, said strap having a buckle 8.

In order to protect the breast of the horse from flies and to insure proper connection of the fly net to the front of the horse, I provide breast straps 9. In Figure 1 of the drawings, the straps 9 are shown as connected by a mating hook and loop 10, and are connected to the end edges of the body 1 by means of rings 11. The rings 11 are held in place on the body 1 by extending forwardly the edge portions of the body and folding these portions upon themselves and then securing said folded portions to the faces of the confronting edge portions. As will be seen in Figure 1, the breast straps 9 will be comfortably positioned about the breast of the horse and will be adapted for movement as required by movement of the horse.

In Figure 2 of the drawings, there is shown a slightly changed breast strap construction. In this figure, the breast straps are shown at 12 and 13, and are formed as a continuation of the side margins of the body 1. If desired, the breast straps 12 and 13 may be sewed to the forward end portions of the side margins. The breast strap 12 has a ring 14 at its free end while the breast strap 13 has a hook 15 at its free end. The hook 15 will be engageable in the ring 14 for effectively securing the breast straps about the breast of the horse.

As shown in Figures 1, 3 and 4 of the drawings, I provide strings, indicated by the numeral 16, which depend from the body 1 and the breast strap 9 or breast straps 12 and 13. As best seen in Figure 4, each two of the strings 16 are formed from a single strand of braided or laced material, the strand being turned upon itself medially of its length, and the bight portion 17, defined at the turning point, is secured in the fold of the margin of the body 1. In other words, as clearly shown in Figure 3, the body 1 is folded upon itself at its free side margins, at 18, and the remaining free portion is again folded to lie in confronting relation with the first mentioned portion. The bight portions 17 are confined between the latter mentioned portion, which will be designated by the numeral 19, and the portion 18. Fasteners 20, which may comprise stitching, retain the folded portions 18 and 19 in proper relative positions. It will be understood that by folding the body 1, at its side margins, in the manner described, the necessity for webbing for holding the strings in place will be eliminated. The strings 16 will, as clearly shown, depend from the body and breast straps in parallel spaced relation to each other to define an effective net for keeping flies from biting or stinging the body of the horse.

Attention is particularly directed to the fact that as I employ braided strings, unraveling of the strings will not take place. Furthermore, metal tips will not need to be applied to the ends of the strings to prevent unraveling thereof.

Figure 6:
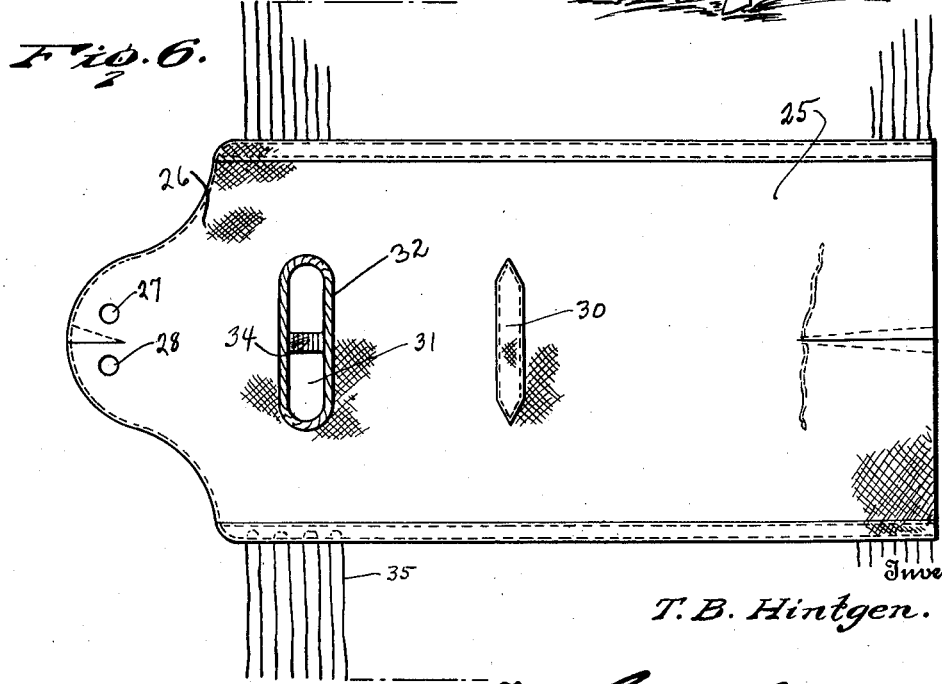
Figure 6 is a top plan view of the modified construction.

Referring now to the modification of the invention illustrated in Figures 5 and 6 of the drawings, the numeral 25 indicates the body of the modified form of fly net. The body is provided with a reduced neck and head portion 26 which is formed with openings 27 and 28 to receive the ears of the horse. Tie strings 29 are connected to the forward end of the body and maintain the forward end of the modified fly net in position. A reinforcing member 30 extends laterally of the body throughout its central portion. The body is provided near its forward end and medially of its width with a cut-away portion 31 which is bound by webbing 32, said webbing being for the purpose of binding the edges. The cut-away portion 31 receives hames, shown in dotted lines at 33, therethrough. An elastic 34 extends transversely of the cut-away portion medially of its length. The body is provided with strings 35 which are connected to the body in the same manner as the strings 16. In operation, the cut-away portion 31, with the elastic 34 therein, allows spreading of the body when the horse lowers his neck, so that pulling of the body out of position will be prevented. The elastic 34 will, of course, return the body about the cut-away portion to normal position when the horse raises his neck to its usual position.

Having thus described the invention, what I claim is:

1. The method of attaching strings to the body of a fly net comprising the step of folding marginal portions of said body upon themselves, placing a portion of a string upon said folded portion, again folding the portion to overlie the portion of the string, and fastening the folded portions to each other and to the body at opposite sides of the string portion.

2. The method of securing fly net strings to a fly net body comprising the step of folding a marginal portion of the fly net body upon itself, turning a strand of the fly net strings upon itself medially of its length, again folding the marginal portion upon itself to overlie the bight portion of the strand of string, and fastening the folded portions to each other and to the end of the body at opposite sides of the bight portion.

3. In a fly net, a body adapted to be fitted about the back of an animal and having a head portion formed with openings to receive the animal's ears, said body having a cut-away portion to permit spreading of the body upon movement of the animal's neck, and means carried by the body and extending transversely of the cut-away portion for returning the body to normal position upon raising of the animal's neck.

4. In a fly net as recited in claim 3, wherein said means comprises an elastic extending transversely of the cut-away portion.

5. In a fly net as recited in claim 3, wherein the cut-away portion is bound by webbing, and said last mentioned means comprising an elastic.

6. In a fly net, a body, breast straps carried by the body and being formed by continuing marginal side portions of said body forwardly, means connecting the forward end portions of the breast straps to each other, and strings carried by the body and the breast straps and depending therefrom throughout the entire marginal length of the sides of the body and of the breast straps, each pair of strings being formed from a single strand of woven material, bight portions of the strings being attached to the marginal portions of the sides of the body by folds of said body.

THEODORE B. HINTGEN.